United States Patent [19]

Strongin et al.

[11] Patent Number: 5,774,600
[45] Date of Patent: Jun. 30, 1998

[54] METHOD OF PIXEL AVERAGING IN A VIDEO PROCESSING APPARATUS

[75] Inventors: Geoffrey S. Strongin; Yi Liu; Michael R. Tucker, all of Austin, Tex.

[73] Assignee: Advanced Micro Devices, Inc., Sunnyvale, Calif.

[21] Appl. No.: 424,028

[22] Filed: Apr. 18, 1995

[51] Int. Cl.⁶ .................................................. G06K 9/36
[52] U.S. Cl. .......................................... 382/276; 382/232
[58] Field of Search .................................... 348/441, 571, 348/720, 415, 416; 382/232, 236, 276

[56] References Cited

U.S. PATENT DOCUMENTS

| | | | |
|---|---|---|---|
| 4,580,163 | 4/1986 | Hartmeier | 348/971 |
| 5,144,425 | 9/1992 | Joseph | 358/133 |
| 5,150,210 | 9/1992 | Hoshi et al. | 348/411 |
| 5,150,432 | 9/1992 | Ueno et al. | 382/56 |
| 5,164,828 | 11/1992 | Tahara et al. | 348/412 |
| 5,231,384 | 7/1993 | Kuriacose | 358/141 |
| 5,239,308 | 8/1993 | Keesen | 341/67 |
| 5,245,433 | 9/1993 | Sid-Ahmed et al. | 348/571 |
| 5,247,363 | 9/1993 | Sun et al. | 358/336 |
| 5,268,995 | 12/1993 | Diefendorff et al. | 395/121 |
| 5,280,577 | 1/1994 | Trevett et al. | 395/150 |
| 5,287,420 | 2/1994 | Barrett | 382/56 |
| 5,293,481 | 3/1994 | Mita et al. | 395/163 |
| 5,353,062 | 10/1994 | Maeda | 348/412 |
| 5,357,282 | 10/1994 | Lee | 348/403 |
| 5,371,547 | 12/1994 | Siracusa et al. | 348/426 |
| 5,379,351 | 1/1995 | Fandrianto | 382/41 |
| 5,386,232 | 1/1995 | Golin et al. | 348/391 |
| 5,408,269 | 4/1995 | Tsukagoshi | 348/416 |
| 5,410,553 | 4/1995 | Choon | 371/31 |
| 5,442,655 | 8/1995 | Dedic et al. | 375/340 |
| 5,488,419 | 1/1996 | Hai et al. | 348/417 |
| 5,497,434 | 3/1996 | Wilson | 382/232 |
| 5,502,493 | 3/1996 | Meyer | 348/426 |
| 5,523,847 | 6/1996 | Feig et al. | 358/261.3 |
| 5,543,846 | 8/1996 | Yagasaki | 348/415 |
| 5,552,831 | 9/1996 | Machida et al. | 348/416 |
| 5,610,657 | 3/1997 | Zhang | 348/415 |
| 5,614,958 | 3/1997 | Shikakura | 348/616 |
| 5,627,765 | 5/1997 | Robotham et al. | 364/514 R |

OTHER PUBLICATIONS

Hochstadt, *The Functions of Mathematical Physics*, 1971.

Dr. Richard Baker, "Standards Dominate Videoconferencing Implementations", Computer Design, Dec. 1994, pp. 66–70.

Stephen Ohr, "Digital Video Spearheads TV and Videoconferencing Applications", Computer Design, Dec. 1994, pp. 59–64.

Lawrence A. Rowe, et al., "MPEG Video in Software: Representation, Transmission, and Playback", High Speed Networking and Multimedia Computing, Symp. on Elec. Imaging Sci. & Tech., San Jose, CA, Feb., 1994, pp. 1–11.

Peng H. Ang, et al., "Video Compression Makes Big Gains", IEEE Spectrum, Oct. 1991, pp. 16–19.

(List continued on next page.)

*Primary Examiner*—Yon Couso
*Attorney, Agent, or Firm*—Skjerven, Morrill, Macpherson, Franklin, & Friel, LLP; Stephen A. Terrile

[57] ABSTRACT

A method of pixel averaging is disclosed which advantageously employs a relatively low number of registers, relatively few memory accesses and a relatively low number of steps. A first register is loaded with a first sequence of pixel values which are to be averaged with a second sequence of pixel values loaded into a second register. The pixel values of the first sequence are stored in respective segments of the first register and the pixel values of the second sequence are stored in respective segments of the second register. The pixel values in the first and second registers are shifted to the right by one. The most significant bit of each of the segments of the first register and the most significant bit of each of the segments of the second register are masked. First masked quotients are thus obtained in each of the segments of the first register and second masked quotients are thus obtained in each of the segments of the second register. The first masked quotients in the segments of the first register are added to respective second masked quotients in the second register to obtain a plurality of pixel value averages.

30 Claims, 8 Drawing Sheets

OTHER PUBLICATIONS

Andy C. Hung, et al., "A Comparison of Fast Inverse Discrete Cosine Transform Algorithms", Multimedia Systems, ©1994, pp. 204–217.

P1180/D1, "Draft Standard Specification for the Implementations of 8x8 Inverse Discrete Cosine Transform", May 29, 1990, pp. 1–9.

ISO/IEC 11172–1, Information Technology–Coding of Moving Pictures and Associated Audio for Digital Storage Media at up to about 1,5 Mbit/s–Part 1: Systems, Aug. 1, 1993, pp. i–vi, 1–53.

ISO/IEC 11172–2, Information Technology–Coding of Moving Pictures and Associated Audio for Digital Storage Media at up to about 1,5 Mbit/s–Part 1: Video, Aug. 1, 1993, pp. i–x. 1–112.

ISO/IEC 11172–3, Information Technology–Coding of Moving Pictures and Associated Audio for Digital Storage Media at up to about 1,5 Mbit/s–Part 1: Audio, Aug. 1, 1993, pp. i–vi, 1–150.

Kevin L. Gong, et al., "Parallel MPEG–1 Video Encoding", Report, University of California, Berkeley, Computer Science Division, 1994, pp. 1–14.

INTRA-FRAME AVERAGING

FRAME 1

INTER-FRAME AVERAGING

| P₀ | P₁ | P₂ | P₃ | P₄ | ••• | |

| P′₀ | P′₁ | P′₂ | P′₃ | P′₄ | ••• | |

FIG. 7

METHOD OF PIXEL AVERAGING IN A VIDEO PROCESSING APPARATUS

CROSS REFERENCE TO RELATED PATENT APPLICATIONS

This patent application is related to the commonly assigned copending patent application entitled "SYSTEM FOR OPTIMIZING STORAGE OF VIDEO DATA ARRAYS IN MEMORY" by Rita O'Brien, Attorney Docket No. M-3138US, (Ser. No. 08/423,769 filed Apr. 18, 1995, now pending, the disclosure of which is incorporated herein by reference.

This patent application is also related to the commonly assigned copending patent application entitled "METHOD OF ADAPTIVELY PERFORMING MOTION COMPENSATION IN A VIDEO PROCESSING APPARATUS" by Tucker et al., (Ser. No. 08/424,019, filed Apr. 18, 1995) now pending, the disclosure of which is incorporated herein by reference.

BACKGROUND OF THE INVENTION

1. Field of the Invention

The present invention relates to video processing and, more particularly, to pixel averaging of video information.

2. Description of Related Art

Because video information requires a large amount of storage space, video information is generally compressed. Accordingly, to display compressed video information which is stored, for example on a compact disk read only memory (CD ROM), the compressed video information must be decompressed to provide decompressed video information. The decompressed video information is then provided in a bit stream to a display. The bit stream of video information is typically stored in a plurality of memory storage locations corresponding to pixel locations on a display. The stored video information is generally referred to as a bit map. The video information required to present a single screen of information on a display is called a frame. A goal of many video systems is to quickly and efficiently decode compressed video information so as to provide motion video.

Generally, motion video information is compressed, i.e., encoded, as a sequence of frames. Accordingly, to present the video information on a display screen, the compressed sequence of frames must be decompressed, i.e., decoded. One compression standard which has attained widespread use for compressing and decompressing video information is the Moving Pictures Expert Group (MPEG) standard for video encoding and decoding.

Frames within the MPEG standard are divided into 16×16 pixel macroblocks. Each macroblock includes six 8×8 blocks: four luminance (Y) blocks, one chrominance red ($C_r$) block and one chrominance blue ($C_b$) block. The luminance blocks correspond to sets of 8×8 pixels on a display and control the brightness of respective pixels. The chrominance blocks to a large extent control the colors for sets of four pixels. For each set of four pixels on the display, there is a single $C_r$ characteristic and a single $C_b$ characteristic.

Figure 1A:
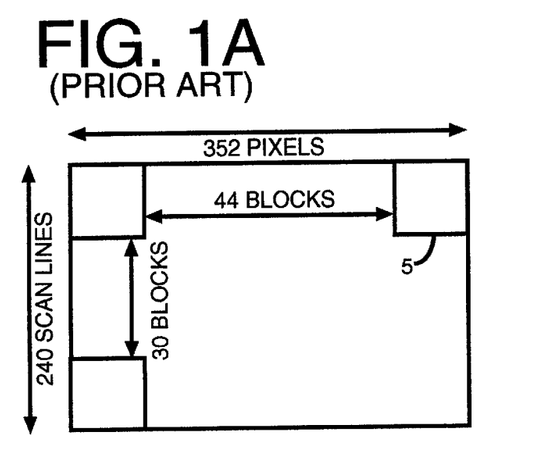
FIG. 1A is a representation of a standard MPEG screen layout including a plurality of macroblocks.

For example, referring to FIG. 1A, labeled prior art, a frame presented by a typical display includes 240 lines of video information in which each line has 352 pixels. Accordingly, a frame includes 240×352=84,480 pixel locations. Under the MPEG standard, this frame of video includes 44 by 30 luminance blocks or 1320 blocks of luminance video information. Additionally, because each macroblock of information also includes two corresponding chrominance blocks, each frame of video information also includes 330 $C_r$ blocks and 330 $C_b$ blocks. Accordingly, each frame of video information requires 126,720 pixels= 1,013,760 bits of bit mapped storage space for presentation on a display.

There are three types of frames of video information which are defined by the MPEG standard, intra-frames (I frame), forward predicted frames (P frame) and bidirectional-predicted frames (B frame).

An I frame is encoded as a single image having no reference to any past or future frame. Each block of an I frame is encoded independently. Accordingly, when decoding an I frame, no motion processing is necessary. However, for the reasons discussed below, it is necessary to store and access I frames for use in decoding other types of frames.

A P frame is encoded relative to a past reference frame. A reference frame is a P or I frame. The past reference frame is the closest preceding reference frame. Each macroblock in a P frame can be encoded either as an I macroblock or as a P macroblock. A P macroblock is stored within a 16×16 area of a past reference frame plus an error term. To specify the location of the P macroblock, a motion vector (i.e., an indication of the relative position of the macroblock with reference to the past reference frame) is also encoded. When decoding a P macroblock, the P macroblock from the reference frame is offset according to motion vectors.

B frames are frames which occur between two reference frames. There may be multiple B frames between a pair of reference frames. B frame macroblocks may be predicted from the past reference frame, the future reference frame, or it may be predicted by interpolating (averaging) a block in the past reference frame with a block in the future reference frame.

A B frame is encoded relative to the past reference frame and a future reference frame. The future reference frame is the closest subsequent reference frame. Accordingly, the encoding of a B frame is similar to that of an P frame with the exception that a B frame motion vector may refer to areas in the future of the reference frame. For macroblocks that use both past and future reference frames, the two 16×16 areas are averaged. When decoding a B frame, the current B macroblock is obtained by averaging the 16×16 areas from the past and future reference frames. The macroblocks from the reference frame are offset according to motion vectors.

The above described scheme using I, P and B frames and motion vectors is often referred to as motion compensation. Motion compensation is one of the most computationally intensive operations in many common video decompression methods. When pixels change between video frames, this change is often due to predictable camera or subject motion. Thus, a block of pixels in one frame can be obtained by translating a block of pixels in a previous or subsequent frame. The amount of translation is referred to as the motion vector. A motion vector is typically a full pixel or half-pixel resolution. When a motion vector has half pixel resolution, an averaging procedure or method is used at each pixel of the previous (or subsequent) frame to compute the motion compensated pixel of the current frame which is to be displayed.

Moreover, as mentioned earlier, compression methods such as MPEG employ bi-directional motion compensation (B macroblocks) wherein a macroblock of pixels in the current frame is computed as the average or interpolation of a macroblock from a previous frame and a macroblock from the subsequent frame.

Both averaging and interpolation are computationally intensive operation which require extensive processor resources. Averaging and interpolation severely burden the system processor in a general purpose computer system since these operations require one or more additions and divisions for each pixel to be displayed. In a worst case scenario, when there is a half pixel resolution in both the x and y directions for both the previous and subsequent frames in interpolated motion compensation, 7 additions and 3 divisions (one by 2 and two by 4) must be performed for every pixel in the block. These operations require temporary storage space which uses more bits than the storage space occupied by the pixels themselves. Consequently, simultaneous operations on multiple pixels cannot easily be performed in a single register.

A significant need exists for reducing the processing requirements associated with decompressing methods. Moreover, reduction of the number of memory accesses associated with decompressing methods is also desirable. The reduction of the number of registers employed for temporary storage while decompressing an image is also advantageous. While such increased efficiencies are needed, it is important that the quality of the resulting video image not be overly degraded.

SUMMARY OF THE INVENTION

Accordingly, a method of pixel averaging is disclosed which advantageously reduces memory accesses and which requires a relatively low number of registers to implement.

In accordance with one embodiment of the present invention, a method of pixel value averaging is provided which includes the step of loading a first plurality of pixel values into respective segments of a first register. Each of the segments of the first register have a most significant bit. The method also includes loading a second plurality of pixel values into respective segments of a second register. Each of the segments of the second register having a most significant bit. The method further includes the steps of shifting the first plurality of pixel values in the first register to the right by one bit and masking the most significant bit of each of the segments of the first register to obtain a first masked quotient in each of the segments of the first register. The method also includes the step of shifting the second plurality of pixel values in the second register to the right by one bit and masking the most significant bit of each of the segments of the second register to obtain a second masked quotient in each of the segments of the second register. The pixel averaging method also includes adding the second masked quotients in the segments of the second register to respective first masked quotients in the segments of the first register to provide a plurality of pixel value averages.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 2A–2L depicts a conventional sequence of register manipulations for averaging the pixels of FIG. 1B.

FIG. 4A–4G show a sequence of register manipulations which are performed in one intra-frame averaging embodiment of the invention for half pixel resolution motion vectors.

FIG. 6A–6G show a sequence of register manipulations which are performed in one inter-frame averaging embodiment of the invention.

DETAILED DESCRIPTION OF THE INVENTION

Figure 1B:
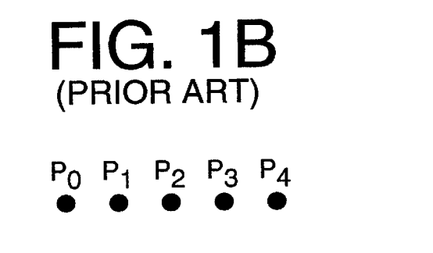
FIG. 1B is representation of a plurality of pixels which are to be averaged.
Figure 2A:
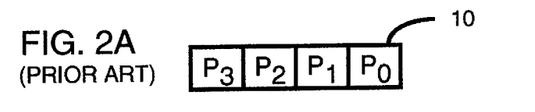

Before describing the apparatus and methodology of the invention in detail it is helpful to first describe a standard averaging or interpolating technique for comparison purposes. FIG. 1B shows a sequence of 5 pixels $P_0$, $P_1$, $P_2$, $P_3$, $P_4$ which form part of a frame which is to be displayed. More particularly, pixels $P_0$, $P_1$, $P_2$, $P_3$, $P_4$ are situated within a macroblock such as macroblock 5 of the frame depicted in FIG. 1A. One standard technique for pixel averaging or interpolation is shown in FIGS. 2A–2L. It is assumed that the following pixel averages are to be determined:

$(P_0+P_1)/2$, $(P_1+P_2)/2$, $(P_2+P_4)/2$ and $(P_3+P_4)/2$ wherein $P_0$, $P_1$, $P_2$, $P_3$, $P_4$ are pixels such as shown in FIG. 1B for example.

Figure 2B:
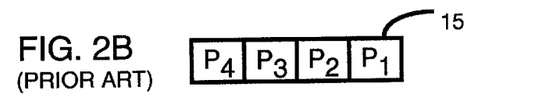

In this particular example, an averaging technique is described for 8 bit pixels and 32 bit registers although other pixel depths and register sizes can also be used. As shown in FIG. 2A, a first set of four 8-bit pixels $P_0$, $P_1$, $P_2$, $P_3$ are read into a 32 bit register 10. A second set of four 8-bit pixels $P_1$, $P_2$, $P_3$, $P_4$ is then read into another 32 bit register 15 as shown in FIG. 2B.

Figure 2C:
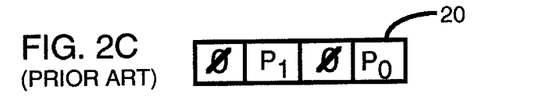
Figure 2D:
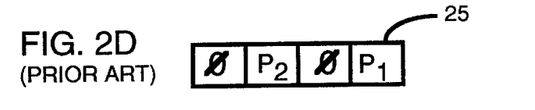
Figure 2E:
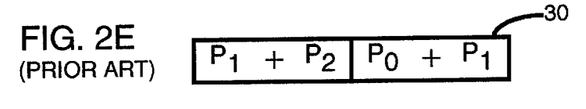

The $P_0$, $P_1$, $P_2$ and $P_3$ pixels are processed first. The $P_0$ pixel and the $P_1$ pixel are unpacked into 16 bit words in register 20 as indicated in FIG. 2C. The $P_1$ pixel and the $P_2$ pixel are then unpacked into 16 bit words in register 25 as indicated in FIG. 2D. The contents of registers 20 and 25 are then added together and the result is stored in register 30 as shown in FIG. 2E. The resultant sum $(P_0+P_1)$ and $(P_1+P_2)$ is thus obtained.

Figure 2F:
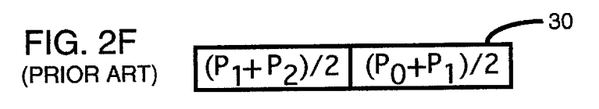
Figure 2G:
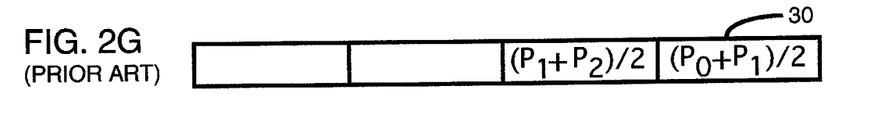

The contents of register 30 are then shifted to the right by one. The right shift operation divides each 16 bit portion of the quantity stored in register 30 by two. This right shift operation results in the quantities $(P_1+P_2)/2$ and $(P_0+P_1)/2$ being stored as 8 bit quantities in register 30 as shown in FIG. 2F. These quotients are then packed into register 30 as shown in FIG. 2G.

Figure 2H:
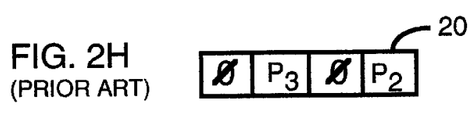
Figure 2I:
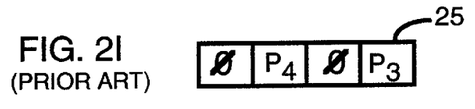
Figure 2J:
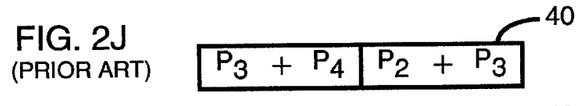

The $P_2$, $P_3$ and $P_4$ pixels are now processed. More specifically, the $P_3$ pixel and the $P_2$ pixel are unpacked into 16 bit words in register 20 as indicated in FIG. 2H. The $P_4$ pixel and the $P_3$ pixel are then unpacked into 16 bit words in register 25 as shown in FIG. 2I. The contents of register 20 and 25 are then added together and the result is stored in register 40 as shown in FIG. 2J. The result $(P_3+P_4)$ and $(P_2+P_3)$ is thus obtained.

Figure 2K:
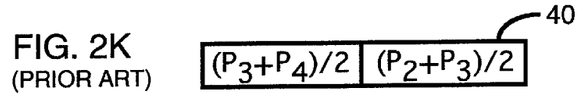
Figure 2L:
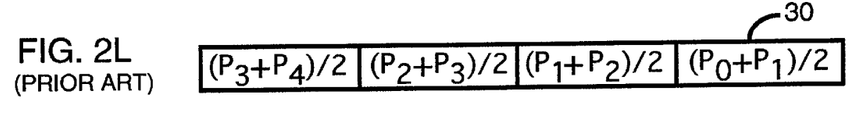

The contents of register 40 are then shifted to the right by one. The right shift operation divides each 16 bit portion of the quantity stored in register 40 by two. This right shift operation results in the quotients $(P_3+P_4)/2$ and $(P_2+P_3)/2$ as shown in FIG. 2K. These 8 bit results $(P_3+P_4)/2$ and $(P_2+P_3)/2$ are then packed into the upper half of register 30 as shown in FIG. 2L.

While the above method succeeds in averaging pixels, it does so at the expense of a large number of steps, a large number of memory accesses and with the utilization of a large number of registers for temporary storage purposes.

In the course of decompressing compressed video images such as those encoded and compressed with the MPEG standard, it is often desirable to perform intra-frame averaging of pixel values. Intra-frame averaging involves averaging pixel values of one macroblock of a frame with pixels of that macroblock from the same frame. Pixels in the same frame are averaged when half pixel (half pel) motion compensation is used. This is referred to as intraframe averaging. Pixels in different frames are averaged when interpolated motion compensation is performed. This is referred to as inter-frame averaging.

Figure 3A:
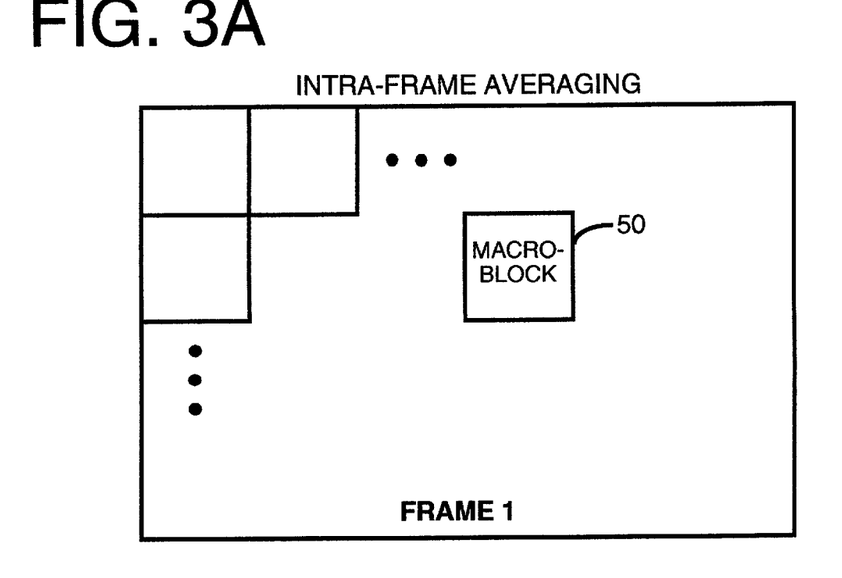
FIG. 3A is representation of a MPEG frame including a macroblock on which intra-frame averaging is to be performed.
Figure 3B:
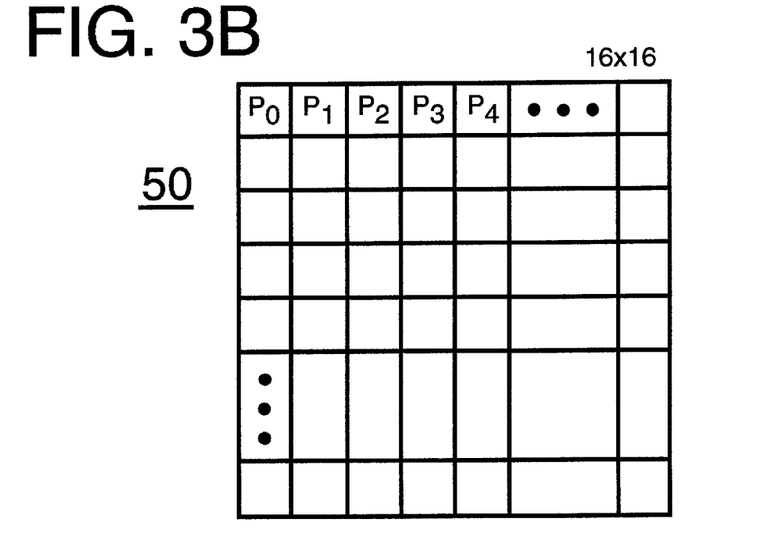
FIG. 3B is representation of a MPEG macroblock on which intra-frame averaging is to be performed.
Figure 3C:
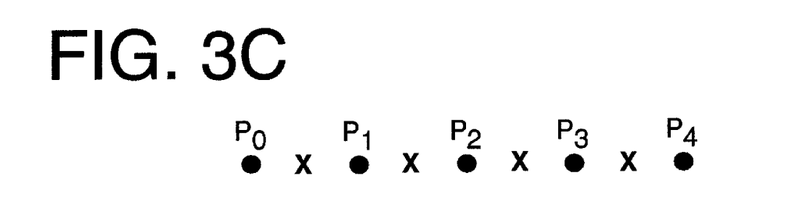
FIG. 3C is a representation of a sequence of pixels from an MPEG macroblock on which intra-frame averaging is to be performed.

FIG. 3A is a representation of a frame designated frame 1 which includes a plurality of macroblocks such as macroblock 50. Macroblock 50 includes an 16×16 matrix of pixels as shown in FIG. 3B. Representative pixels $P_0$, $P_1$, $P_2$, $P_3$, $P_4$ are shown in macroblock 50. To demonstrate the disclosed method of averaging pixels it is assumed that we desire to determine the pixel values designated X which are effectively positioned between pixels $P_0$, $P_1$, $P_2$, $P_3$, $P_4$ within the same frame as shown in FIG. 3C. Determining the averages between these adjacent pixel pairs in the same frame provides half pixel resolution.

Figure 4A:
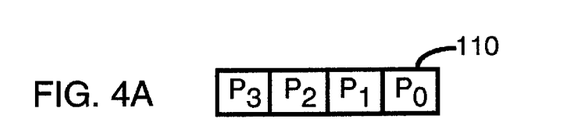
Figure 4B:
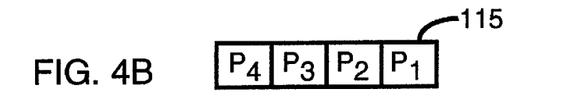
Figure 4C:
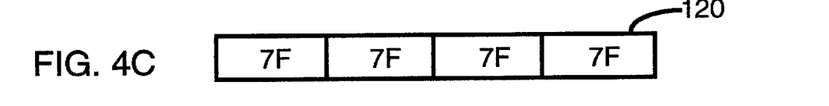
Figure 4D:
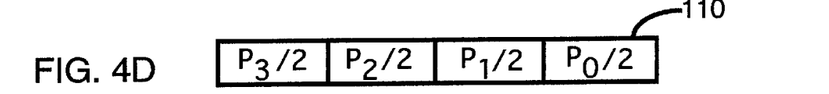

The disclosed method of intra-frame averaging pixel values is shown in detail in FIGS. 4A–4G. As shown in FIG. 4A, a first set of four 8-bit pixels $P_0$, $P_1$, $P_2$, $P_3$ are read into a 32 bit register 110. A second set of four 8-bit pixels $P_1$, $P_2$, $P_3$, $P_4$ is then read into another 32 bit register 115 as shown in FIG. 4B. It should be appreciated that the disclosed method applies to other pixel depths and register widths as well. The contents of register 110 are shifted to the right by one to divide the contents by two. The 32 bit result is masked with the mask 7F, 7F, 7F, 7F shown in FIG. 4C to remove the most significant bit (MSB) from each of the 8-bit segments of register 110. The mask is stored in register 120. The resultant masked quotient $P_3/2$, $P_2/2$, $P_1/2$, $P_0/2$ is stored in the respective 8-bit segments of register 110. It is noted that register 110 is advantageously re-used in the steps of FIG. 4A and FIG. 4D.

The contents of register 115 are then shifted to the right by one to divide the contents by two. The 32 bit result is masked with the mask 7F, 7F, 7F, 7F shown in FIG. 4E to remove the most significant bit (MSB) from each of the 8-bit segments of register 115. The mask is stored in register 120. The resultant masked quotient $P_4/2$, $P_3/2$, $P_2/2$, $P_1/2$ is stored in the respective 8-bit segments of register 115. Advantageously, register 115 is re-used in the steps of FIG. 4B and FIG. 4E.

Figure 4E:
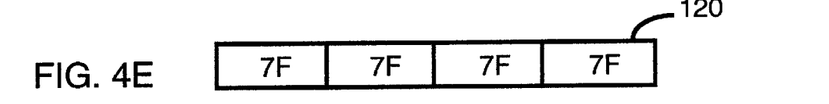
Figure 4F:
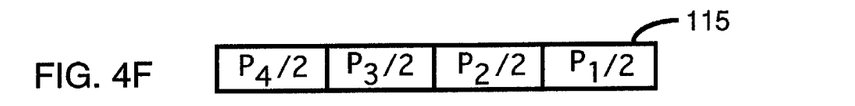
Figure 4G:
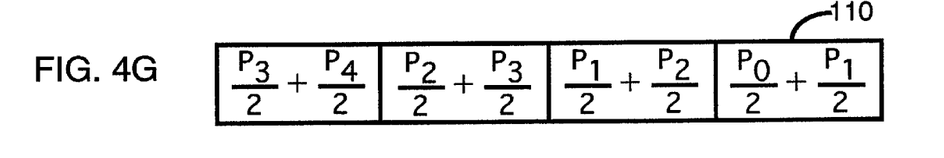

The contents of register 115 are added to the contents of register 110 to form the sum, $P_3/2+P_4/2$, $P_2/2+P_3/2$, $P_1/2+P_2/2$, $P_1/2+P_1/2$, which is stored in register 110. It is noted that register 110 is again advantageously re-used. The resultant sum is then stored in the main memory of the particular computer which is used to implement the method.

Figure 5A:
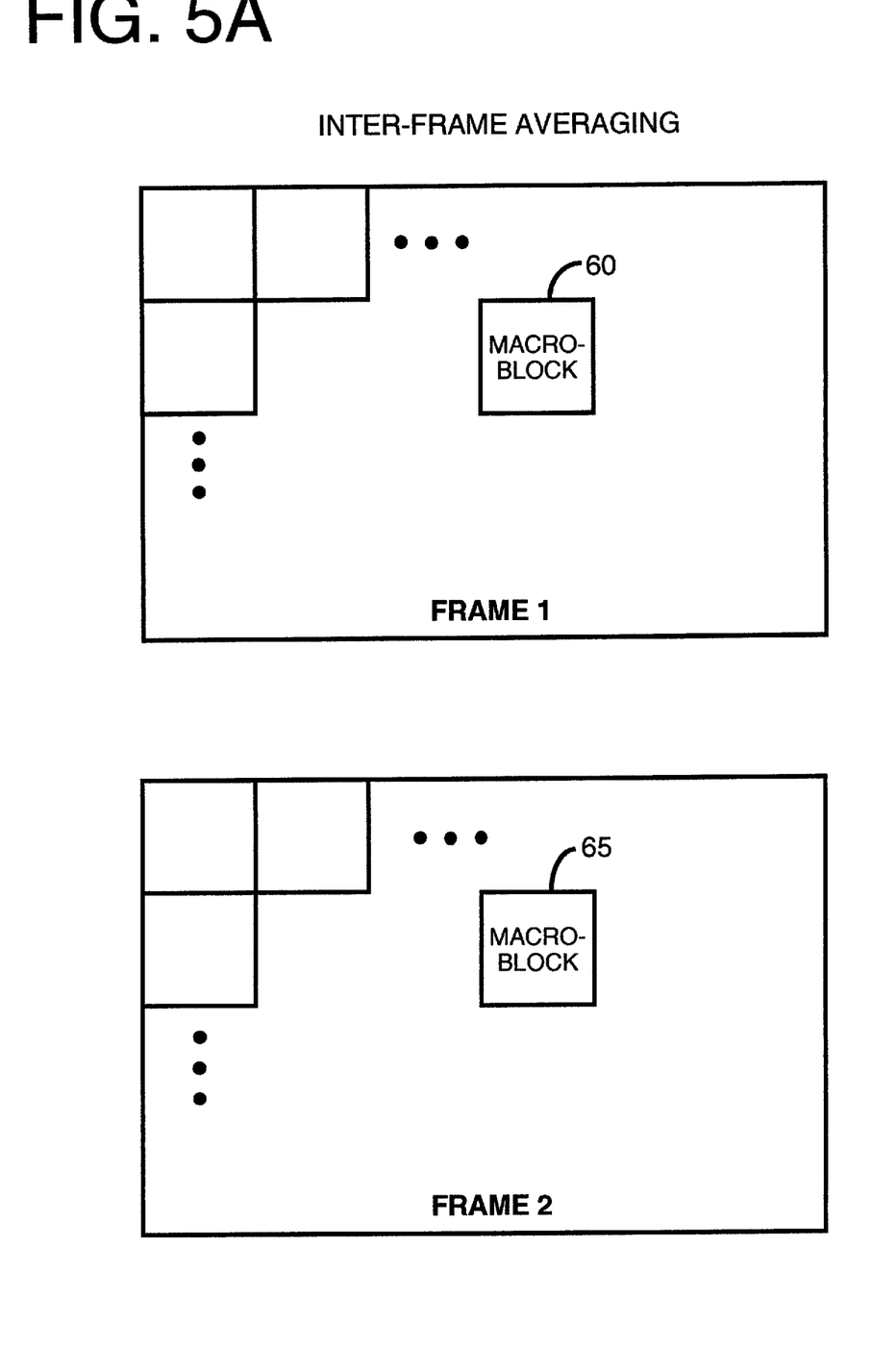
FIG. 5A and 5B show pixels in respective macroblocks on which inter-frame averaging is to be performed.
Figure 5B:
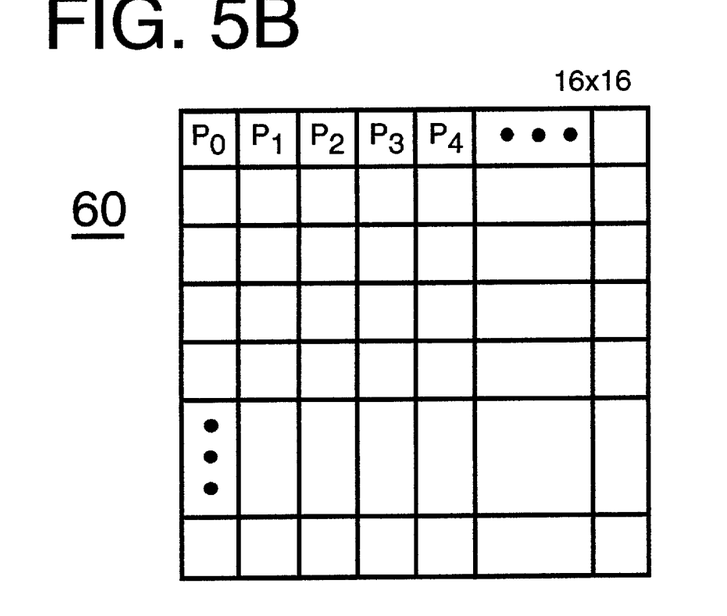
Figure 5C:
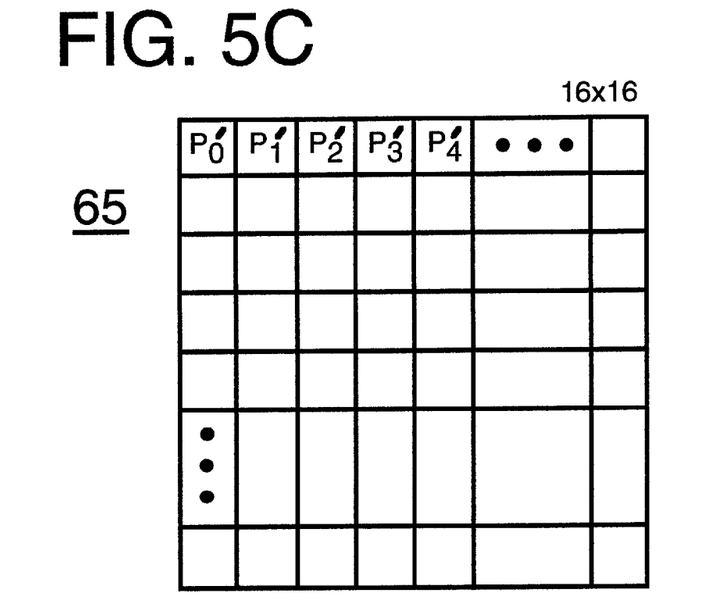

While the above averaging method is useful in obtaining pixel averages with respect to intra-frame averaging, the method is also useful in obtaining pixel averages for use in inter-frame or frame-to-frame averaging. FIG. 5A shows a first frame (frame 1) and a second frame (frame 2) which include respective macroblocks 60 and 65 which are to be averaged. More particularly, pixels $P_0$, $P_1$, $P_2$, $P_3$ of macroblock 60 (see FIG. 5B) from frame 1 are to be averaged with pixels $P_0'$, $P_1'$, $P_2'$, $P_3'$ of macroblock 65 (see FIG. 5C) from frame 2. This is inter-frame averaging and is shown in detail in FIG. 6A–6B.

Figure 6A:
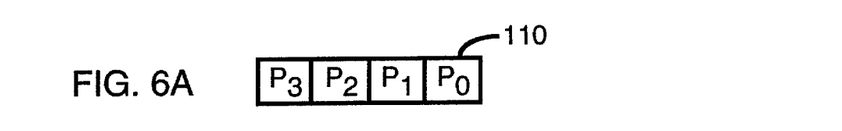
Figure 6B:
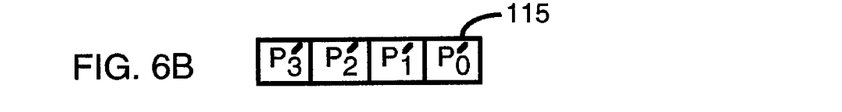
Figure 6C:
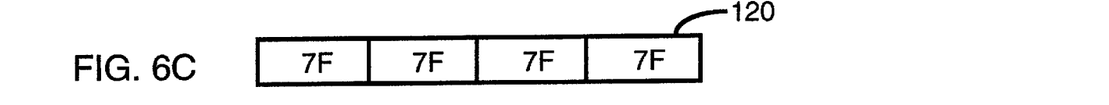
Figure 6D:
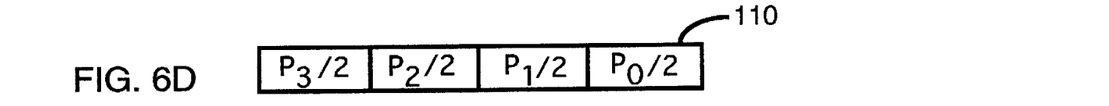

As shown in FIG. 6A, a first set of four 8-bit pixels $P_0$, $P_1$, $P_2$, $P_3$ is read into a 32 bit register 110. A second set of four 8-bit pixels $P_0'$, $P_1'$, $P_2'$, $P_3'$ is then read into another 32 bit register 115 as shown in FIG. 6B. It should be appreciated that the disclosed method applies to other pixel depths and register widths as well. The contents of register 110 are shifted to the right by one to divide the contents by two. The 32 bit result is masked with the mask 7F, 7F, 7F, 7F shown in FIG. 6C to remove the most significant bit (MSB) from each of the 8-bit segments of register 110. The mask is stored in register 120. The resultant masked quotient $P_3/2$, $P_2/2$, $P_1/2$, $P_0/2$ is stored in the respective 8-bit segments of register 110. Advantageously, register 110 is re-used in the steps of FIG. 6A and FIG. 6D.

The contents of register 115 are then shifted to the right by one to divide the contents by two. The 32 bit result is masked with the mask 7F, 7F, 7F, 7F shown in FIG. 6E to remove the most significant bit (MSB) from each of the 8-bit segments of register 115. The mask is stored in register 120. The resultant masked quotient $P_3'/2$, $P_2'/2$, $P_1'/2$, $P_0'/2$ is stored in the respective 8-bit segments of register 115. Advantageously, register 115 is re-used in the steps of FIG. 6B and FIG. 6E.

Figure 6E:
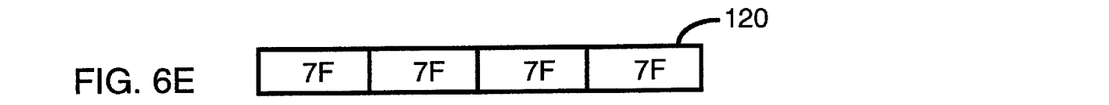
Figure 6F:
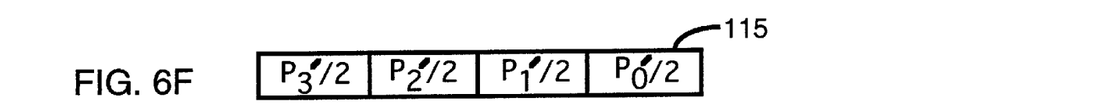
Figure 6G:
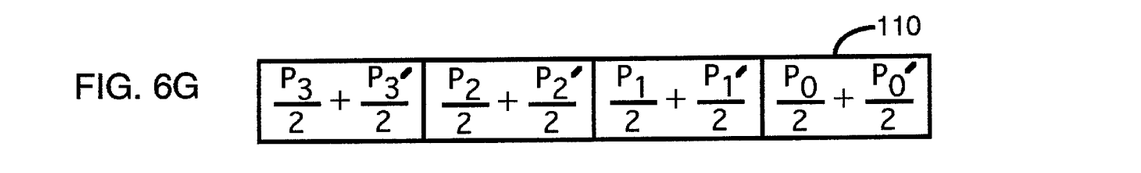

The contents of register 115 are added to the contents of register 110 to form the sum, $P_3/2+P_3'/2$, $P_2/2+P_2'/2$, $P_1/2+P_1'/2$, $P_0/2+P_0'/2$, which is stored in register 110. It is noted that register 110 is again advantageously re-used. The resultant sum is then stored in the main memory of the particular computer which is used to implement the method.

Figure 7:
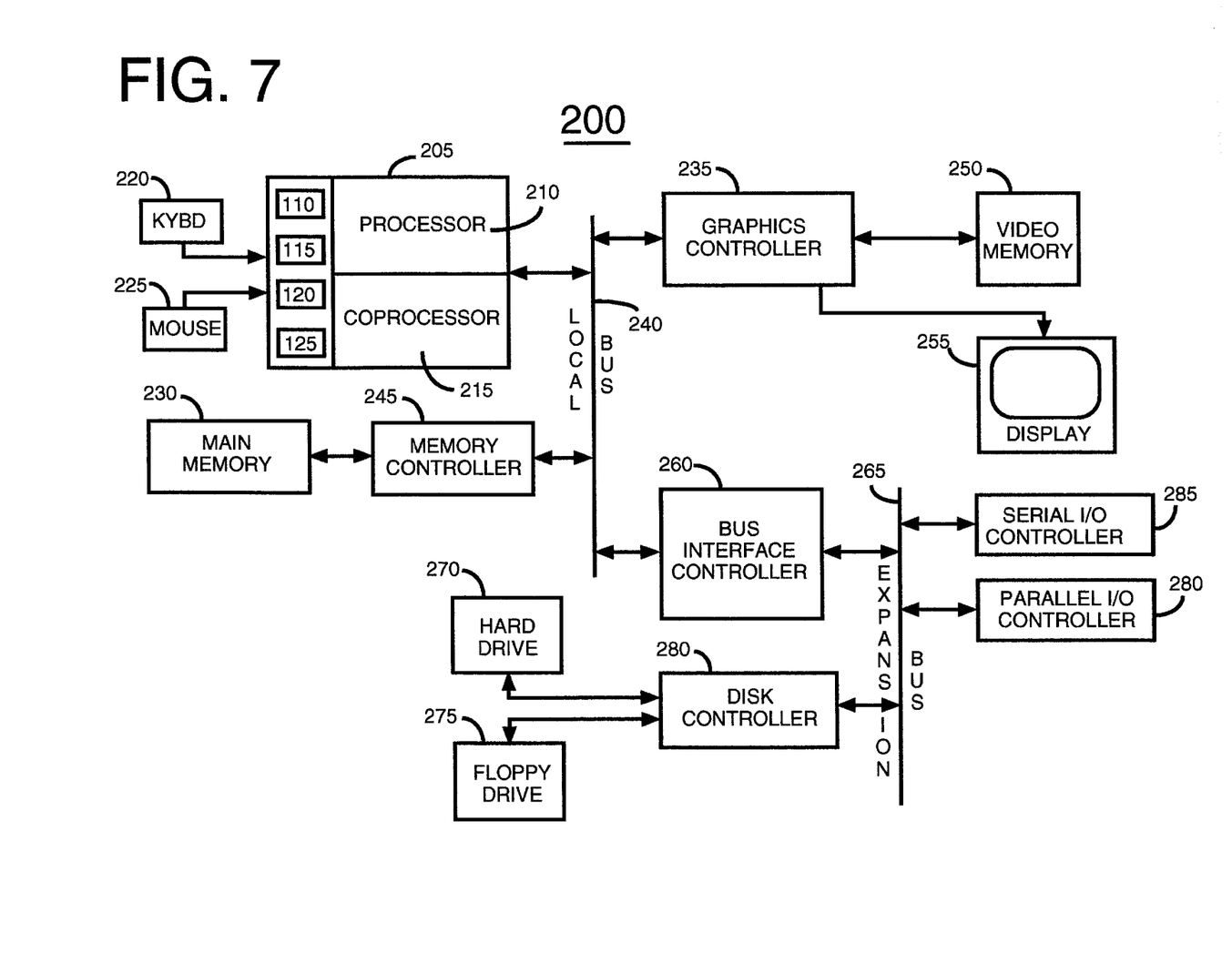
FIG. 7 is one computer apparatus on which the disclosed pixel value averaging method can be employed.

FIG. 7 shows one embodiment of a computer apparatus 200 for interpolating or averaging pixels of the same frame (intra-frame averaging) or between frames (interframe averaging). The disclosed intra-frame and interframe pixel averaging methodology is practiced on such a computer apparatus, for example. While the computer apparatus 200 of FIG. 7 is a general purpose computer, it will be appreciated that custom hardware can also be employed for implementing the disclosed pixel averaging method.

Computer apparatus 200 includes a microprocessor 205 having a processor 210 for processing integer instructions and a coprocessor 215 for processing floating point instructions. In this particular embodiment, microprocessor 205 is an X86 microprocessor, although other types of microprocessors such as RISC microprocessors can also be used. Microprocessor 205 includes registers 110, 115, 120 and 125 as shown in FIG. 7. Registers 110, 115, 120 and 125 are 32 bit registers which each hold 4 8-bit segments in this particular embodiment. It should be appreciated that the size of these registers can vary according to the particular application. A keyboard 220 and mouse pointing device 225 are coupled to microprocessor 205 to provide input to the microprocessor. Main memory 230 and a graphics controller 235 reside on a common local bus 240 which is coupled to microprocessor 205. More specifically, a memory controller 245 couples main memory 230 to local bus 240. A video memory 250 and display 255 are coupled to graphics controller 235 to enable graphics and video images to be transmitted to display 255.

A bus interface controller 260 couples local bus 240 to expansion bus 265. Expansion bus 265 is a Peripheral Component Interconnect (PCI) bus, an Industry Standard Architecture (ISA) bus or other bus architecture, if desired. A hard drive 270 and a floppy drive 275 are coupled by a disk controller 280 to expansion bus 265 as shown. A serial I/O controller 285 and a parallel I/O controller 290 are coupled to expansion bus 265 to permit the coupling of external serial and parallel devices to computer 200.

To implement the earlier described pixel averaging method, registers 110, 115, 120 and 125 within microprocessor 205 are loaded with pixels which are then manipulated as described in detail with respect to FIGS. 4A–4G and 6A–6G. Main memory 230 is accessed to retrieve pixels $P_0$, $P_1$, $P_2$, $P_3$, $P_4$ for entry into registers 110 and 115 as per FIG. 4A and 4B when intra-frame averaging is employed. Main memory 230 is also accessed to retrieve pixels $P_0$, $P_1$, $P_2$, $P_3$ and pixels $P_0'$, $P_1'$, $P_2'$, $P_3'$ for entry into registers 110 and 115 as per FIG. 6A and 6B when inter-frame average is employed. Upon completion of the register manipulations specified in FIG. 4A–4G and 6A–6G, the resultant averaged pixels are stored in video memory 250 and displayed on display 255. It is noted that the resultant average is either stored in video memory 250 or main memory 230. For example, if no additional processing needs to be performed on a particular macroblock, then the resultant averaged pixels can be written directly to video memory 250 for display. However, if additional processing is needed, such as in the case where error terms need to be added to the resultant pixels, then the resultant averaged pixels are written to main memory for appropriate further manipulation.

One use for the disclosed pixel averaging method and pixel averaging apparatus is in decompressing video images such as those compressed using the MPEG standard. The MPEG standard is described in International Standard ISO/IEC 11172-2 "Information Technology—Coding of Moving Pictures And Associated Audio For Digital Storage Media At About 1.5 Mbit/sec", the contents of which are incorporated herein by reference.

The foregoing has described a method and apparatus for pixel averaging which reduces the processing requirements associated with video decompression. The disclosed pixel averaging method and apparatus reduces the number of memory accesses and the number of registers used for temporary storage to achieve pixel averaging.

While only certain preferred features of the invention have been shown by way of illustration, many modifications and changes will occur. It is, therefore, to be understood that the present claims are intended to cover all such modifications and changes which fall within the true spirit of the invention.

We claim:

1. A method of pixel value averaging comprising the steps of:

loading a first plurality of pixel values into respective segments of a first register, each of the segments of the first register having a most significant bit;

loading a second plurality of pixel values into respective segments of a second register, each of the segments of the second register having a most significant bit;

shifting the first plurality of pixel values in the first register to the right by one bit;

masking the most significant bit of each of the segments of the first register to obtain a first masked quotient in each of the segments of the first register;

shifting the second plurality of pixel values in the second register to the right by one bit;

masking the most significant bit of each of the segments of the second register to obtain a second masked quotient in each of the segments of the second register; and adding the second masked quotients in the segments of the second register to respective first masked quotients in the segments of the first register to provide a plurality of pixel value averages.

2. The method of claim 1 further comprising the step of storing the plurality of pixel value averages in the segments of the first register.

3. The method of claim 1 further comprising the step of storing the plurality of pixel value averages in the segments of the second register.

4. The method of claim 1 further comprising the steps of:

retrieving the first plurality of pixels from a memory prior to the loading a first plurality of pixel values step; and retrieving the second plurality of pixels from a memory prior to the loading a second plurality of pixel values step.

5. The method of claim 1 further comprising the step of storing the plurality of pixel averages in memory.

6. The method of claim 1 further comprising the step of displaying indicia of the plurality of averaged pixels.

7. A method of pixel value averaging comprising the steps of:

loading a first plurality of pixel values from a first video frame into respective segments of a first register, each of the segments of the first register having a most significant bit;

loading a second plurality of pixel values from the first video frame into respective segments of a second register, each of the segments of the second register having a most significant bit;

shifting the first plurality of pixel values in the first register to the right by one bit;

masking the most significant bit of each of the segments of the first register to obtain a first masked quotient in each of the segments of the first register;

shifting the second plurality of pixel values in the second register to the right by one bit;

masking the most significant bit of each of the segments of the second register to obtain a second masked quotient in each of the segments of the second register; and adding the second masked quotients in the segments of the second register to respective first masked quotients in the segments of the first register to provide a plurality of pixel value averages.

8. The method of claim 7 further comprising the step of storing the plurality of pixel value averages in the segments of the first register.

9. The method of claim 7 further comprising the step of storing the plurality of pixel value averages in the segments of the second register.

10. The method of claim 7 further comprising the steps of:

retrieving the first plurality of pixels from a memory prior to the loading a first plurality of pixel values step; and retrieving the second plurality of pixels from a memory prior to the loading a second plurality of pixel values step.

11. The method of claim 7 further comprising the step of storing the plurality of pixel averages in memory.

12. The method of claim 7 further comprising the step of displaying indicia of the plurality of averaged pixels.

13. A method of pixel value averaging comprising the steps of:

loading a first plurality of pixel values from a first video frame into respective segments of a first register, each of the segments of the first register having a most significant bit;

loading a second plurality of pixel values from a second video frame into respective segments of a second register, each of the segments of the second register having a most significant bit;

shifting the first plurality of pixel values in the first register to the right by one bit;

masking the most significant bit of each of the segments of the first register to obtain a first masked quotient in each of the segments of the first register;

shifting the second plurality of pixel values in the second register to the right by one bit;

masking the most significant bit of each of the segments of the second register to obtain a second masked quotient in each of the segments of the second register; and adding the second masked quotients in the segments of the second register to respective first masked quotients in the segments of the first register to provide a plurality of pixel value averages.

14. The method of claim 13 further comprising the step of storing the plurality of pixel value averages in the segments of the first register.

15. The method of claim 13 further comprising the step of storing the plurality of pixel value averages in the segments of the second register.

16. The method of claim 13 further comprising the steps of:

retrieving the first plurality of pixels from a memory prior to the loading a first plurality of pixel values step; and retrieving the second plurality of pixels from a memory prior to the loading a second plurality of pixel values step.

17. The method of claim 13 further comprising the step of storing the plurality of pixel averages in memory.

18. The method of claim 13 further comprising the step of displaying indicia of the plurality of averaged pixels.

19. A method for displaying video information comprising:

compressing the video information into a sequence of video frames where each video frame contains a plurality of pixel values;

storing the sequence of video frames in a memory;

decompressing the sequence of video frames, the decompressing step including a method of pixel value averaging comprising the steps of:

loading a first plurality of pixel values from a first video frame into respective segments of a first register, each of the segments of the first register having a most significant bit;

loading a second plurality of pixel values from the first video frame of the sequence into respective segments of a second register, each of the segments of the second register having a most significant bit;

shifting the first plurality of pixel values in the first register to the right by one bit;

masking the most significant bit of each of the segments of the first register to obtain a first masked quotient in each of the segments of the first register;

shifting the second plurality of pixel values in the second register to the right by one bit;

masking the most significant bit of each of the segments of the second register to obtain a second masked quotient in each of the segments of the second register; and adding the second masked quotients in the segments of the second register to respective first masked quotients in the segments of the first register to provide a plurality of pixel value averages.

20. The method of claim 19, the decompressing step further comprising:

storing the plurality of pixel value averages in the segments of the first register.

21. The method of claim 19, the decompressing step further comprising:

storing the plurality of pixel value averages in the segments of the second register.

22. The method of claim 19, the decompressing step further comprising:

retrieving the first plurality of pixels from the memory prior to the loading a first plurality of pixel values step; and retrieving the second plurality of pixels from the memory prior to the loading a second plurality of pixel values step.

23. The method of claim 19 further comprising:

storing the plurality of pixel averages in a memory.

24. The method of claim 19 further comprising:

displaying indicia of the plurality of averaged pixels.

25. A method for displaying video information comprising:

compressing the video information into a sequence of video frames where each video frame contains a plurality of pixel values;

storing the sequence of video frames in a memory;

decompressing the sequence of video frames, the decompressing step including a method of pixel value averaging comprising the steps of:

loading a first plurality of pixel values from a first video frame of the sequence into respective segments of a first register, each of the segments of the first register having a most significant bit;

loading a second plurality of pixel values from a second video frame of the sequence into respective segments of a second register, each of the segments of the second register having a most significant bit;

shifting the first plurality of pixel values in the first register to the right by one bit;

masking the most significant bit of each of the segments of the first register to obtain a first masked quotient in each of the segments of the first register;

shifting the second plurality of pixel values in the second register to the right by one bit;

masking the most significant bit of each of the segments of the second register to obtain a second masked quotient in each of the segments of the second register; and adding the second masked quotients in the segments of the second register to respective first masked quotients in the segments of the first register to provide a plurality of pixel value averages.

26. The method of claim 25, the decompressing step further comprising:

storing the plurality of pixel value averages in the segments of the first register.

27. The method of claim 25, the decompressing step further comprising:

storing the plurality of pixel value averages in the segments of the second register.

28. The method of claim 25, the decompressing step further comprising:

retrieving the first plurality of pixels from the memory prior to the loading a first plurality of pixel values step; and retrieving the second plurality of pixels from the memory prior to the loading a second plurality of pixel values step.

29. The method of claim 25 further comprising:
storing the plurality of pixel averages in a memory.
30. The method of claim 25 further comprising:
displaying indicia of the plurality of averaged pixels.

* * * * *

UNITED STATES PATENT AND TRADEMARK OFFICE
CERTIFICATE OF CORRECTION

PATENT NO. : 5,774,600
DATED : June 30, 1998
INVENTOR(S) : Strongin, Geoffrey S.; Liu, Yi; Tucker, Michael R.

It is certified that error appears in the above-indentified patent and that said Letters Patent is hereby corrected as shown below:

Column 4, line 35, delete "$(P_0+P_1)/2, (P_1+P_2)/2, (P_2+P_4)/2$ and $(P_3+P_4)/2$" and replace with --$(P_0+P_1)/2, (P_1+P_2)/2, (P_2+P_3)/2$ and $(P_3+P_4)/2$--.

Column 5, line 61, delete "$P_2/2, P_1/2+P_1/2$" and replace with --$P_2/2, P_0/2+P_1/2$--.

Signed and Sealed this

Twenty-seventh Day of October, 1998

Attest:

BRUCE LEHMAN

Attesting Officer    Commissioner of Patents and Trademarks